US011380024B1

(12) United States Patent
Guckenberger et al.

(10) Patent No.: US 11,380,024 B1
(45) Date of Patent: Jul. 5, 2022

(54) INSTANT SITUATIONAL AWARENESS VISUALIZATION MODULE PROCESS AND DEVICE

(71) Applicant: VR REHAB, INC., Clermont, FL (US)

(72) Inventors: Elizabeth T. Guckenberger, Clermont, FL (US); Ronald J. Guckenberger, Clermont, FL (US)

(73) Assignee: VR REHAB, INC., Clermont, FL (US)

( * ) Notice: Subject to any disclaimer, the term of this patent is extended or adjusted under 35 U.S.C. 154(b) by 0 days.

(21) Appl. No.: 17/062,011

(22) Filed: Oct. 2, 2020

Related U.S. Application Data (60) Provisional application No. 62/909,497, filed on Oct. 2, 2019.

(51) Int. Cl.
*G06T 11/00* (2006.01)
*G06T 7/70* (2017.01)
*G06T 19/00* (2011.01)

(52) U.S. Cl.
CPC .............. *G06T 11/001* (2013.01); *G06T 7/70* (2017.01); *G06T 19/006* (2013.01)

(58) Field of Classification Search
CPC .............................. G06T 19/006; G06T 7/70
See application file for complete search history.

(56) References Cited

U.S. PATENT DOCUMENTS

| | | | |
|---|---|---|---|
| 9,947,230 B2* | 4/2018 | Hu | G08G 5/0034 |
| 2017/0278307 A1* | 9/2017 | Uetabira | G01S 17/93 |
| 2018/0264364 A1* | 9/2018 | Zou | A63F 13/577 |
| 2019/0147655 A1* | 5/2019 | Galera | G05B 19/4061 |
| | | | 345/419 |
| 2020/0073385 A1* | 3/2020 | Jobanputra | G06F 9/547 |

* cited by examiner

*Primary Examiner* — Samantha (Yuehan) Wang
(74) *Attorney, Agent, or Firm* — Terry M. Sanks, Esq.; Beusse Sanks, PLLC (57) ABSTRACT

Instant Situational Awareness Visualization Module enables new types and classes of Human Computer Interface enhancements where the Humans can easily and simultaneously see where objects are relative within or outside AR shapes as viewed as a picture-in-a-picture inset that provides an overhead view of terrain/map.

20 Claims, 7 Drawing Sheets

INSTANT SITUATIONAL AWARENESS VISUALIZATION MODULE PROCESS AND DEVICE

CROSS-REFERENCE TO RELATED APPLICATIONS

This application which claims the benefit of U.S. Provisional Application No. 62909497 filed Oct. 2, 2019, the entirety of which is incorporated by reference.

STATEMENT REGARDING FEDERALLY SPONSORED RESEARCH OR DEVELOPMENT

The United States government has rights under this invention pursuant to U.S. Contract No. N00014-19-C-2026 entitled Synthetic Vision System for Ground Forces.

BACKGROUND OF THE INVENTION

This invention generally relates to enhancement of Human Computer Interfaces and Augmented/Mixed Realities Situational Awareness (SA), and specifically to providing an overhead picture in a picture inset above target/objects of interest being viewed near the same 2D plane of the observer.

Applicants are not aware of any prior art using or AR applications that visually displays which objects are inside or outside an AR defined region (safety ring) when the observer and target are within that same 2D flat plane, and/or nearly edge on without having any additional meta-knowledge of the objects in 3D space. Applicants are also not aware of any prior art which associates an overhead view of the target area of interest with AR graphics added and a gaze guidance line or flagpole to link the 3D edge viewing with the overhead picture in a picture view of the same area.

Modern computing and display technologies have facilitated the development of virtual reality and augmented reality systems. Virtual reality, or "VR," systems create a simulated environment for a user to experience. This can be done by presenting computer -generated imagery to the user through a display. This imagery creates a sensory experience which immerses the user in the simulated environment. A virtual reality scenario typically involves presentation of only computer-generated imagery rather than also including actual real -world imagery. In the present invention, the concept of VR and real-world imagery is merged so that a controller, for example, a drone operator in a remote location, can view a computer augmented real world display of a target area developed from actual video taken from a drone.

BRIEF SUMMARY OF THE INVENTION

The present invention provides innovative enhancement of Human Computer Interfaces and enhancements of human situational awareness by linking overhead synthetic vision viewing of target areas of interest as a picture in a picture inset, simultaneously displayed with the augmented reality view from the side of the target. Key innovation is that the AR graphics such as conformal rings or other AR shapes that have an inside and outside (or moabi bands) that are projected onto maps or other surfaces can be seen from overhead picture in a picture inset for 'at a glance' visualizations of whether objects are inside or outside the AR shapes. The Instant SA inset can be opaque or semi-transparent so as to still allow viewing of the real-world underneath the picture in a picture inset.

Current augmented reality graphics of ground targets that have safety rings around them are very difficult to use for judging if objects are within or outside of the ring. A safety ring defines an area around a target that is considered to be within a zone of avoidance. An area outside the ring is considered to be safe. When the target and safety ring are being viewed from ground level, and if the ring is conformal with the ground, it is hard or impossible to see and determined the area of the safety ring. If the target is implemented as a 3D wall/cylinder on the Augmented Reality (AR) display, objects are not typically discernible as being within or outside the ring (unless another information source segments the objects and provides position information). The present invention provides instant situational awareness by adding a picture -in-a-picture inset using a 3D synthetic vision terrain as seen from directly overhead of the target(s) area of interest. The invention may also include a default implementation incorporating a gaze guidance line (or flag pole) to visually connect a target building top to the bottom of the instant SA PiP inset. Users are able to simultaneously view the real-world target area of interest through the AR-HMD (Augmented Reality-Helmet Mounted Display, plus the Instant SA (Situational Awareness) PiP inset. In a Level 1, the user can tell which buildings and roads are within or outside the safety ring. In Level 2 blue force tracker information is added so that the user can see which entities (friendly personnel or vehicles) are within or outside of the safety ring. In a Level 3 a drone is automatically flown into an overhead position in the real-world to provide real-time video of the AR safety ring and definitively show all entities are within or outside of the safety ring. While the invention is disclosed in terms of a military application, it will be appreciated that the invention is not limited to just military applications, this invention may be utilized for any AR and map/terrain/surfaces processes in general, such as, for example, any 3D graphics that have corresponding 2D representations.

The present invention provides human computer interface enhancements where human operators can easily and simultaneously see the overhead view of the target area of interest from above as a picture in a picture inset, as well as through the AR display (optical or video see-through), along with an intuitive gaze guidance line linking the two.

In one implementation, users are able to simultaneously view the real-world target area of interest through the AR-HMD, plus the Instant SA PiP inset. The default implementation includes three levels:

Level 1 is the user can tell which buildings and roads are within or outside the safety circle;

Level 2 adds blue force tracker information so that the user can see which entities (friendly personnel or vehicles) are within or outside of the safety circle;

Level 3 adds a drone automatically flying to the overhead position in the real -world to provide real-time video of the AR safety circle and definitively show all entities are within or outside of the safety circle.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 4 is a screen capture with Instant SA and Mini-Map with Gaze Guidance lines both turned on.

DETAILED DESCRIPTION OF THE INVENTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1:
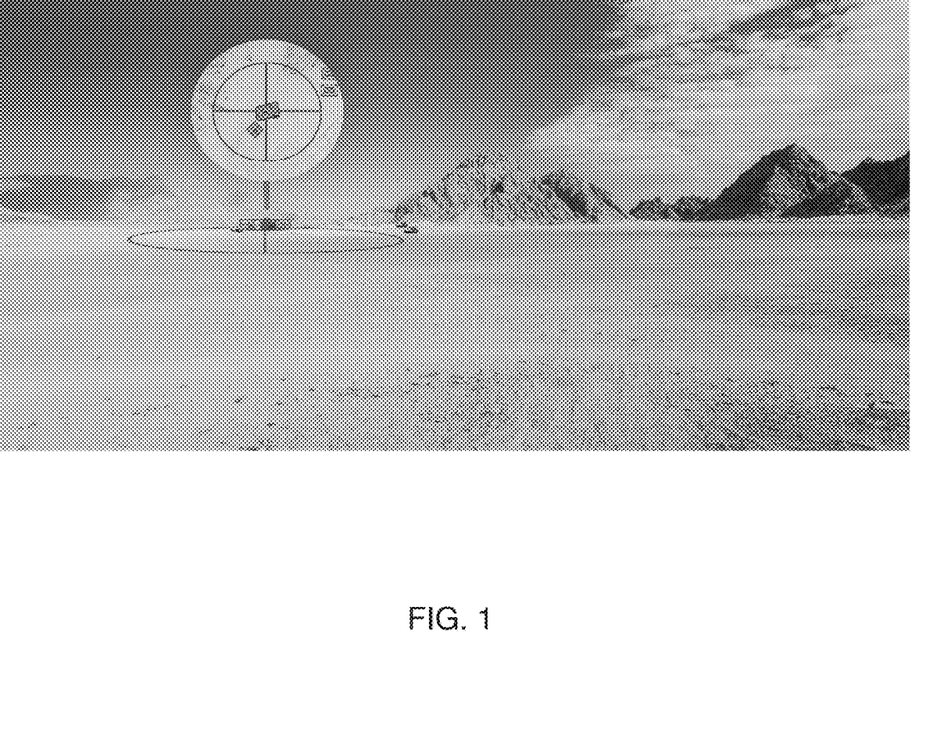
FIG. 1 is a display screen capture of one example of a target in 2D space with an overhead view of the safety ring associated with the target.

FIG. 1 is a screen capture of Instant SA application for one project providing our new Instant SA visualization innovations in the context of enhancing military personnel's situational awareness of a target area. The Instant SA picture-in-a-picture (PiP) inset 100 displays an overhead view of a selected portion of the world, using MapBox or other similar data source. Inset 100 is intuitively visually connected to the center point of the desired area to be display by flagpole 110 which is a line that visually links inset 100 to the terrain. Areas 200 and 210 are two different views of the same augmented reality graphic for a munition splash zone that depicts the Risk Estimation Distance (RED=safety distance to stay out for a specific munition's explosion). Area 200 is the overhead view of the splash zone such that the warfighter can clearly see items that are in or out of the zone. Area 210 shows the 3D perspective view of the splash zone which is more difficult and error prone to see what is in an out of the zone. Elements 300 indicate military type 2525 icons inserted from a separate blue force tracker data source so the friendlies can be judged inside or outside of the splash zone to avoid fratricides. Collectively these elements can be used within augmented reality and mixed realities.

Figure 2:
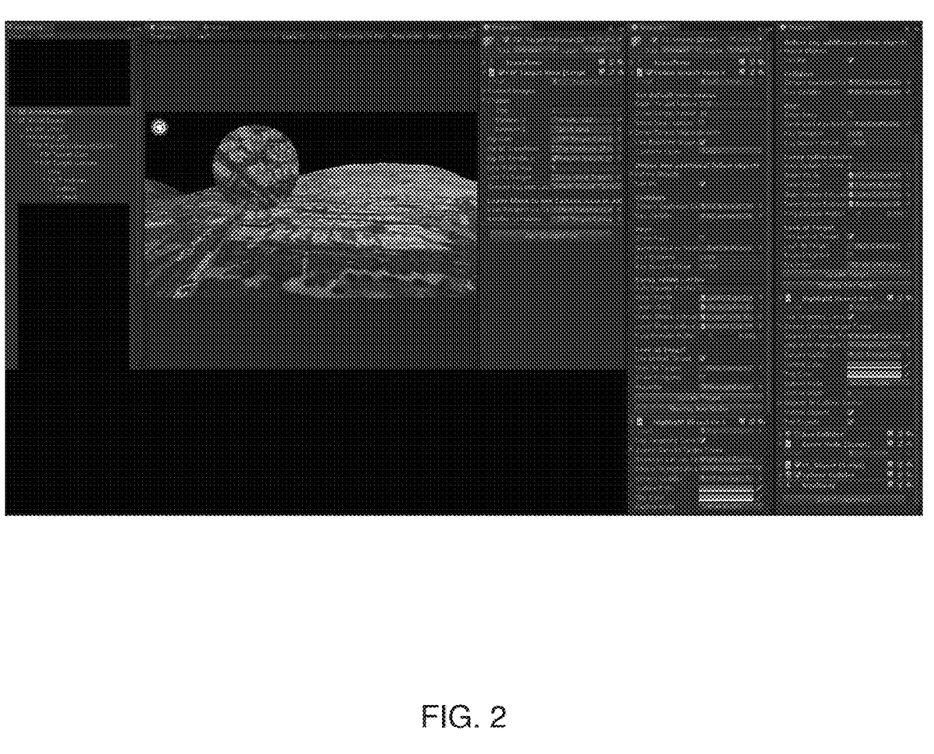
FIG. 2 is a display screen capture of an actual operator display showing a target display and options for view and actions with respect to the target.

FIG. 2 provides an overview of the core modules for Instant SA as displayed as a screen capture within the Unity3D Editor.

Figure 3:
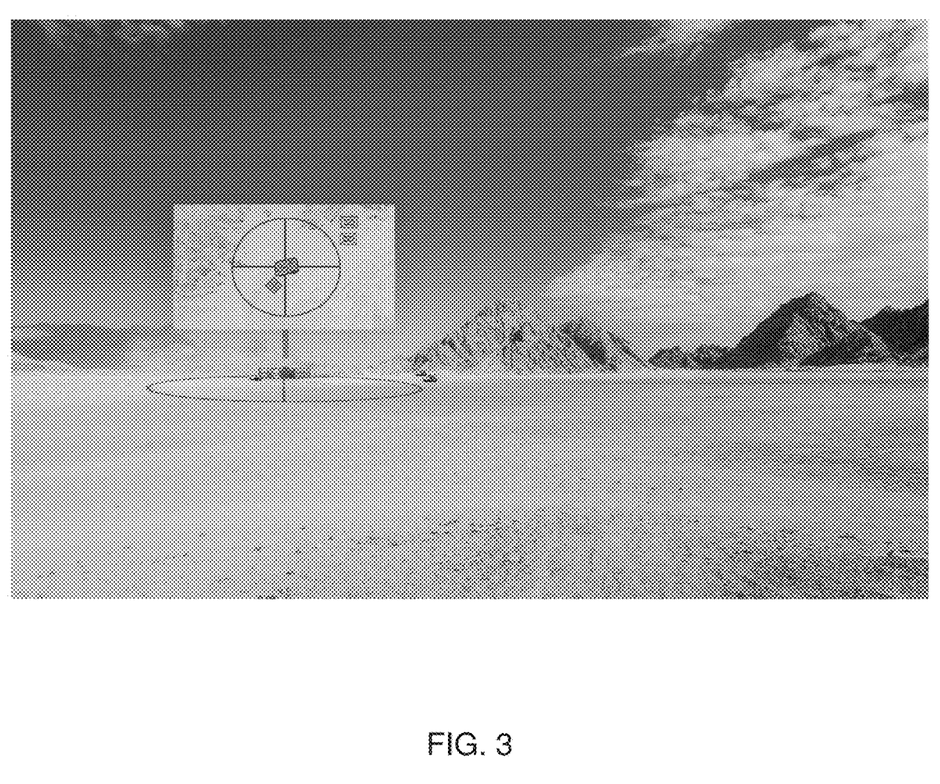
FIG. 3 is an alternative shape for the Instant SA Picture in a Picture inset in rectangular form. Many other shapes, screen sizes, zoom scales of the terrain shown within the Instant SA inset are supported

FIG. 3 Lists the image in the Unity3D editor and the core C# code modules.

FIG. 3 is a screen capture using a different shape picture in a picture inset, along with AR graphics superimposed, in rectangular format. Many other shapes, zooms, fields of view are possible.

Figure 4:
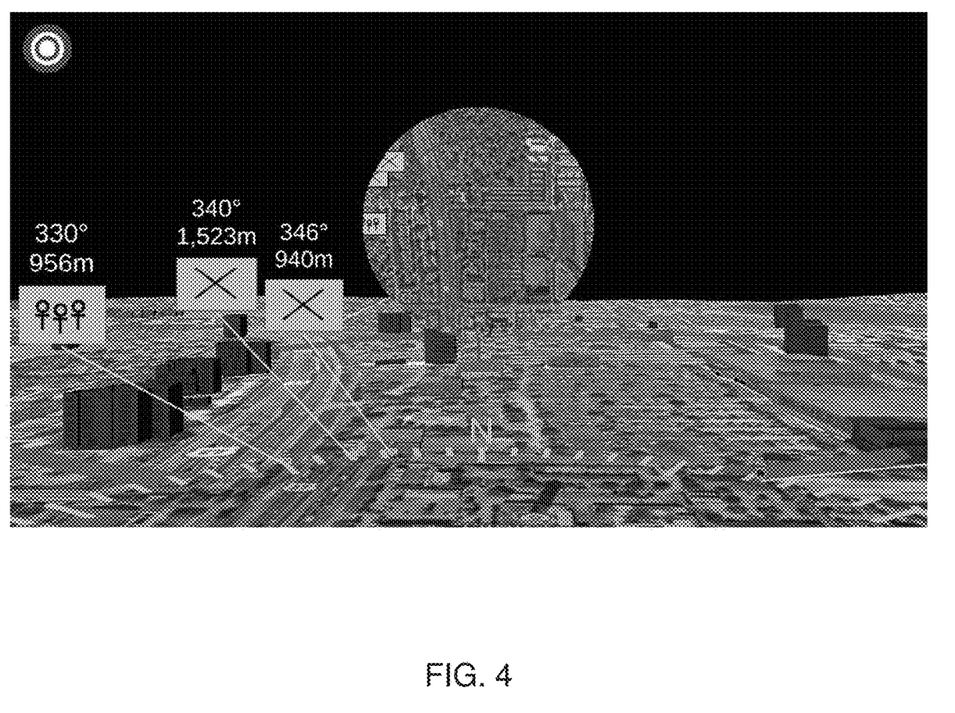

FIG. 4 shows a screen capture of Instant SA application for an ONR project providing our new Instant SA visualization innovations in the context of enhancing military personnel's situational awareness of a target area. The Instant SA picture in a picture inset 500 displays an overhead view of a selected portion of the world, using MapBox or other similar data source. Inset 500 is intuitively visually connected to the center point of the desired area to be display by flagpole 570 which is just a line that visually links inset 500 to the terrain. Areas 550 and 555 are two different views of the same augmented reality graphic for a munition splash zone that depicts the Risk Estimation Distance (RED=safety distance to stay out for a specific munition's explosion). Area 550 is the overhead view of the splash zone such that the warfighter can clearly see items that are in or out of the zone. Area 555 shows the 3D perspective view of the splash zone which is more difficult and error prone to see what is in an out of the zone. Element 510 represents military 2525 type Icons inserted from a separate blue force tracker data source so the friendlies can be judged inside or outside of the splash zone to avoid fratricides.

Item 560 is a MiniMap inset for 2D, 2.5D, and/or 3D viewing for overall situational awareness that also connects via Gaze Guidance Lines 530 (yellow lines within image) the same position or object within the MiniMap with the real-world. The use of Gaze Guidance Lines 530 reduces user's cognitive workload doing mental transforms between the different dimensional representations and reduces time to perform tasks and reduces errors. Collectively these elements can be used within augmented reality and mixed realities.

Additional alternative embodiments use an overhead drone to provide the real-time overhead view inset similarly to the synthetic vision insets shown in the prior figures.

Figure 5:
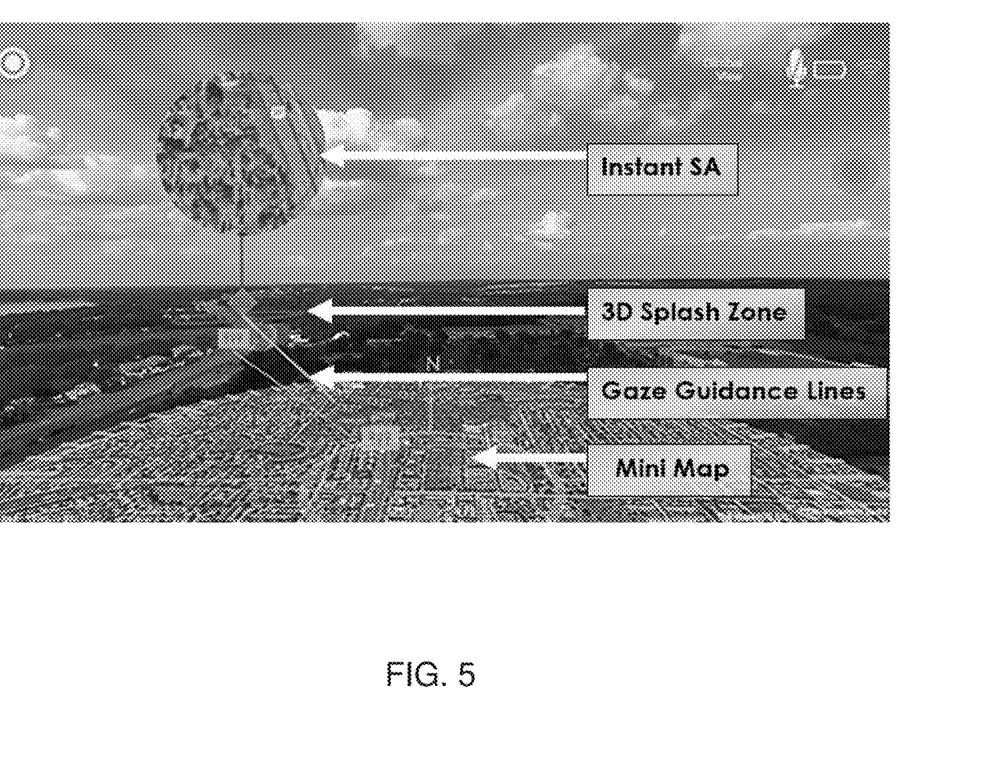
FIG. 5 is an actual screen capture seen through a Microsoft HoloLens2 of Instant SA.

FIG. 5 shows an actual screen capture seen through a Microsoft HoloLens2 of Instant SA where inset 600 is the Instant SA inset connected to the appropriate terrain position through the red Gaze Guidance Line 610, shown in the center of the 3D splash zone 620, targeted against an enemy target shown as a red 2525 icon 630, which is adjacent to the safe friendly unit shown as a blue military 2525 type icon. The foreground of the image shows the minimap 640, along with the 2D map version of splash zone 650, visually linked via Gaze Guidance Lines 660 (yellow lines) to the corresponding real-world AR splash zone 620. Item 670 shows the same splash zone within the Instant SA overhead view 600.

Figure 6:
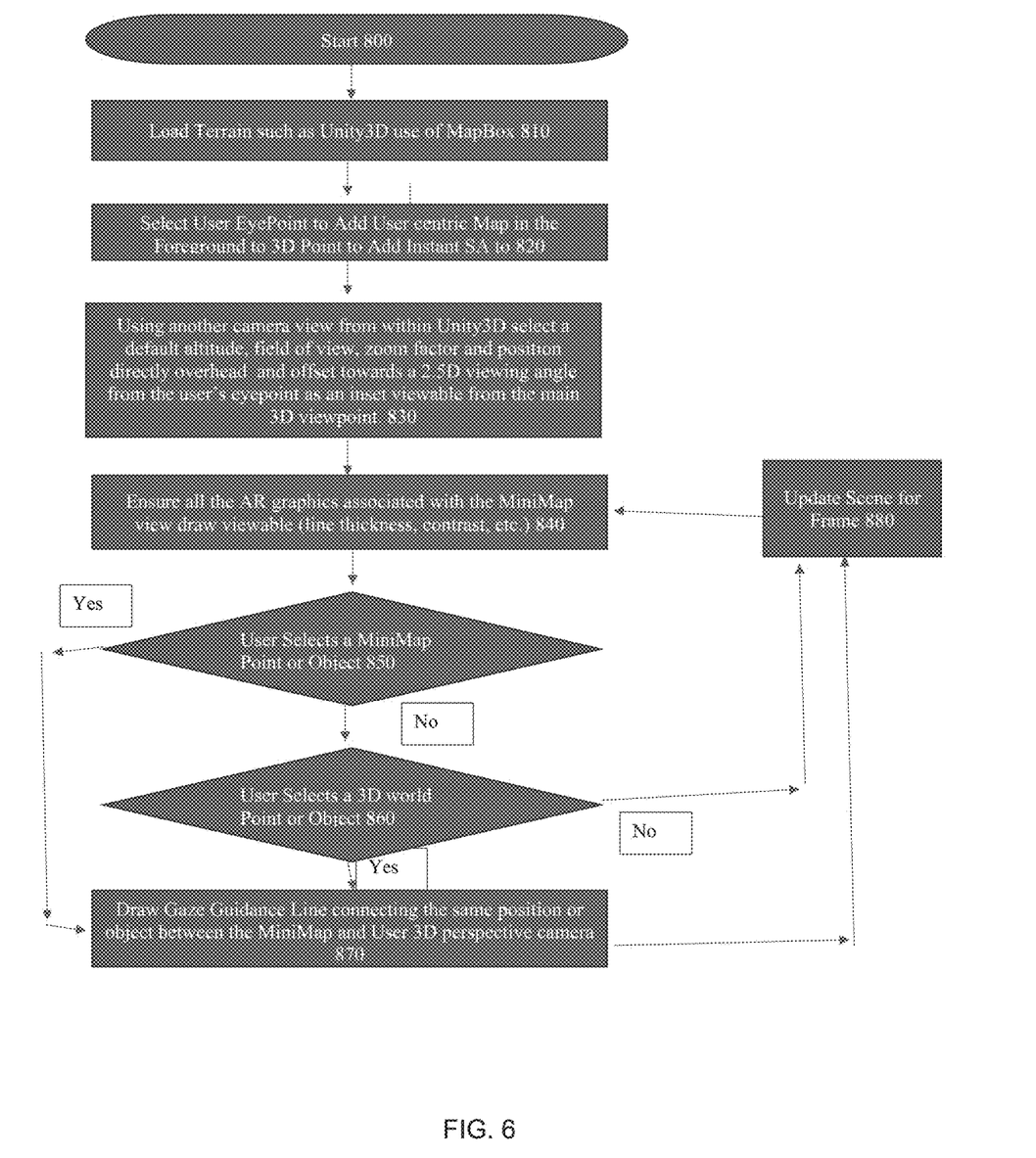
FIG. 6 is a flow chart illustrating one method of implementing the PiP mapping system of the present invention.

FIG. 6 is a flow chart that explains how the above disclosed system operates functionally in one embodiment. The block descriptors are shown in detail in the attached computer program.

Figure 7:
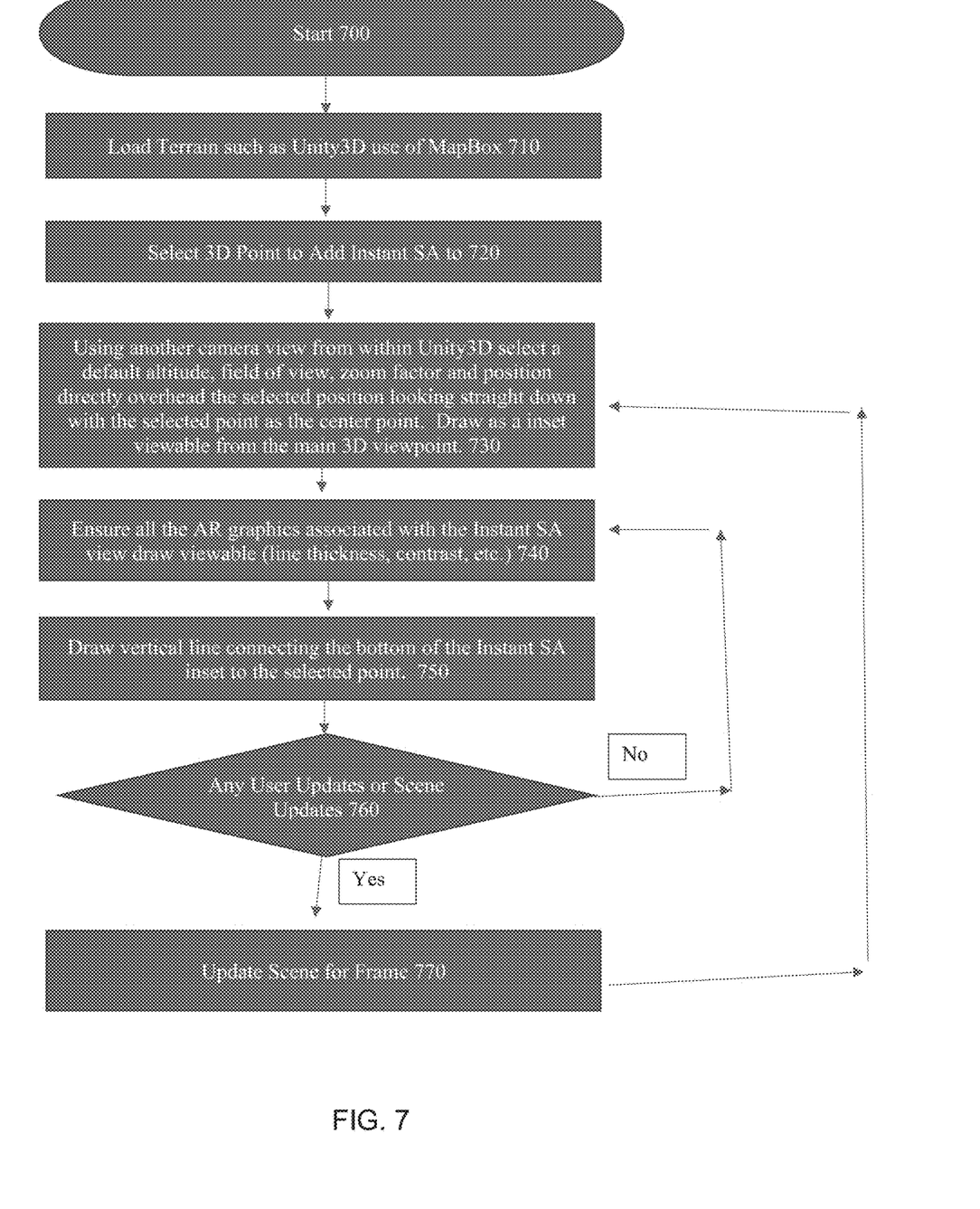
FIG. 7 is a flow chart illustrating mapping of an overhead view to a 2D view of a target area.

FIG. 7 is a flow chart that explains how situational awareness is obtained in one embodiment. The block descriptors are shown in detail in the attached computer program.

While the above description contains many specificities, these should not be construed as limitations on the scope of the invention, but as exemplifications of the presently preferred embodiments thereof. Many other ramifications and variations are possible within the teachings of the invention. For example, elements of the invention can be: Multiple Picture in a picture insets from directly above, and/or other angles, wireframe or other variants of the synthetic vision terrain, other positions relative to the target verse the default directly above, can be below, and be used to provide 3D models of objects (air, space, sea, undersea, underground, not just ground objects The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A method for enhancing visual situational awareness in a two-dimensional field of view of an electronic display device, comprising the steps of:
   providing an augmented reality view of an area of interest on the display device, the area of interest including a splash zone at a known distance from a predetermined location;
   providing an overhead image of the splash zone as an inset on the display device aligned with and positioned above the splash zone; and
   graphically generating a line defining a perimeter of the splash zone for identifying objects inside and outside the splash zone.

2. The method of claim 1, wherein the overhead image is taken from a public source mapping service.

3. The method of claim 1, wherein the overhead image is provided by a drone equipped with an imaging device and in communication with the display device.

4. The method of claim 1, wherein objects inside and outside the area of the splash zone are identified according to Mil. Std-2525.

5. The method of claim 1, wherein the splash zone is not clearly visible in a direct line of sight from the display device and including the further steps of:
   displaying a previously derived mini-map of the area between the display device out to and including the splash zone;
   obtaining an overhead image of the splash zone and displaying the overhead image as an inset on the display device; and
   providing gaze guidance lines from the inset to the splash zone in the mini-map for visually aligning the overhead image with the splash zone.

6. The method of claim 1, wherein the splash zone, other graphics, 2525 identified icons, are simultaneously displayed on both the electronic display device and the inset.

7. The method of claim 1, wherein the inset is semi-transparent to enable viewing of imaged content behind the inset.

8. The method of claim 7, wherein the inset is switchable between a semi-transparent condition, an opaque condition and an invisible condition.

9. A method for enhancing visual situational awareness in a two-dimensional field of view of an electronic display device, comprising the steps of:
   providing an augmented reality view of an area of interest on the display device, the area of interest including a graphic or object at a known distance from a predetermined location;
   providing an overhead image of the graphic or object as an inset on the display device aligned with and positioned above the graphic or object; and
   graphically generating a line defining a perimeter of the graphic or object for identifying a relative position of the graphic or object.

10. The method of claim 9, wherein the overhead image is taken from a public source mapping service.

11. The method of claim 9, wherein the overhead image is provided by a drone equipped with an imaging device and in communication with the display device.

12. The method of claim 9, wherein objects inside and outside the area of interest are identified according to Mil. Std-2525.

13. The method of claim 9, wherein the area of interest is not clearly visible in a direct line of sight from the display device and including the further steps of:
   displaying a previously derived mini-map of the area between the display device out to and including the area of interest;
   obtaining an overhead image of the area of interest and displaying the overhead image as an inset on the display device; and
   providing gaze guidance lines from the inset to the area of interest in the mini-map for visually aligning the overhead image with the area of interest.

14. The method of claim 1, wherein the electronic display device comprises a projected heads-up display.

15. The method of claim 1, wherein the electronic display device comprises an augmented reality headset.

16. A method for enhancing visual situational awareness in a multi-dimensional field of view of an electronic display device, comprising the steps of:
   providing an augmented reality view of an area of interest on the display device, the area of interest including a splash zone at a known distance from a predetermined location;
   providing an overhead image of the splash zone as an inset on the display device aligned with and positioned above the splash zone; and
   graphically generating a line defining a perimeter of the splash zone for identifying objects inside and outside the splash zone.

17. The method of claim 16, wherein the splash zone is not clearly visible in a direct line of sight from the display device and including the further steps of:
   displaying a previously derived mini-map of the area between the display device out to and including the splash zone;
   obtaining an overhead image of the splash zone and displaying the overhead image as an inset on the display device; and
   providing gaze guidance lines from the inset to the splash zone in the mini-map for visually aligning the overhead image with the splash zone.

18. The method of claim 17, wherein the augmented reality view comprises a mixed reality view of the splash zone.

19. The method of claim 16, wherein the electronic display device comprises an integrated combination of mixed and augmented reality electronic display devices.

20. The method of claim 16, wherein the electronic display device comprises multiple displays extending over multiple display devices.

* * * * *